US010221331B2

(12) United States Patent
Deshpande et al.

(10) Patent No.: US 10,221,331 B2
(45) Date of Patent: Mar. 5, 2019

(54) FOG RESISTANT COATINGS

(71) Applicant: SDC Technologies, Inc., Irvine, CA (US)

(72) Inventors: Kiranmayi Deshpande, Irvine, CA (US); David Hess, Irvine, CA (US); Erdem Cetin, Irvine, CA (US); Patrick Monnig, Irvine, CA (US)

(73) Assignee: SDC Technologies, Inc., Irvine, CA (US)

( * ) Notice: Subject to any disclaimer, the term of this patent is extended or adjusted under 35 U.S.C. 154(b) by 0 days.

(21) Appl. No.: 15/423,764

(22) Filed: Feb. 3, 2017

(65) Prior Publication Data

US 2017/0226371 A1 Aug. 10, 2017

Related U.S. Application Data

(60) Provisional application No. 62/291,882, filed on Feb. 5, 2016.

(51) Int. Cl.
C09D 4/00 (2006.01)
C09D 133/14 (2006.01)
C08K 3/22 (2006.01)
C09D 133/06 (2006.01)

(52) U.S. Cl.
CPC ......... C09D 133/14 (2013.01); C09D 133/06 (2013.01); C08K 3/22 (2013.01); C08K 2201/011 (2013.01); C08L 2312/06 (2013.01)

(58) Field of Classification Search
CPC .................................................. C09D 4/00
See application file for complete search history.

(56) References Cited

U.S. PATENT DOCUMENTS

| 2003/0203991 | A1 | 10/2003 | Schottman et al. |
| 2004/0167280 | A1 | 8/2004 | Kayanoki |
| 2011/0250442 | A1* | 10/2011 | Castro ............... B82Y 10/00 428/336 |
| 2014/0166827 | A1 | 6/2014 | Berry |

FOREIGN PATENT DOCUMENTS

| EP | 0399441 A2 | 11/1990 | |
| JP | 11140109 A * | 5/1999 | ............... C09D 4/02 |
| WO | WO 2013191861 A1 * | 12/2013 | ............... C09D 4/00 |

OTHER PUBLICATIONS

Machine-generated English translation of JP 11140109 A.*
International Search Report in International Application No. PCT/US2017/16405 dated Apr. 13, 2017.
Dain, Stephen John et al., "Assessment of fogging resistance of anit-fog personal eye protection," Ophthalmic and Physiological Optics, Aug. 1999, vol. 19, No. 4, pp. 357-361.

* cited by examiner

Primary Examiner — Vu A Nguyen
(74) Attorney, Agent, or Firm — Calfee, Halter & Griswold LLP

(57) ABSTRACT

A coating composition may include one or more radiation-curable resins having reactive groups in a hydrophilic region, a reactive surfactant comprising a reactive moiety; and a photoinitiator, wherein, upon the exposure of the photoinitiator to light energy, the one or more radiation-curable resins are cured to form a hydrophilic network with the reactive surfactant being bound to the network by binding of the reactive moiety of the surfactant to the reactive groups of the one or more radiation-curable resins. The cured coatings provide long lasting, washable, anti-fog properties.

13 Claims, 1 Drawing Sheet

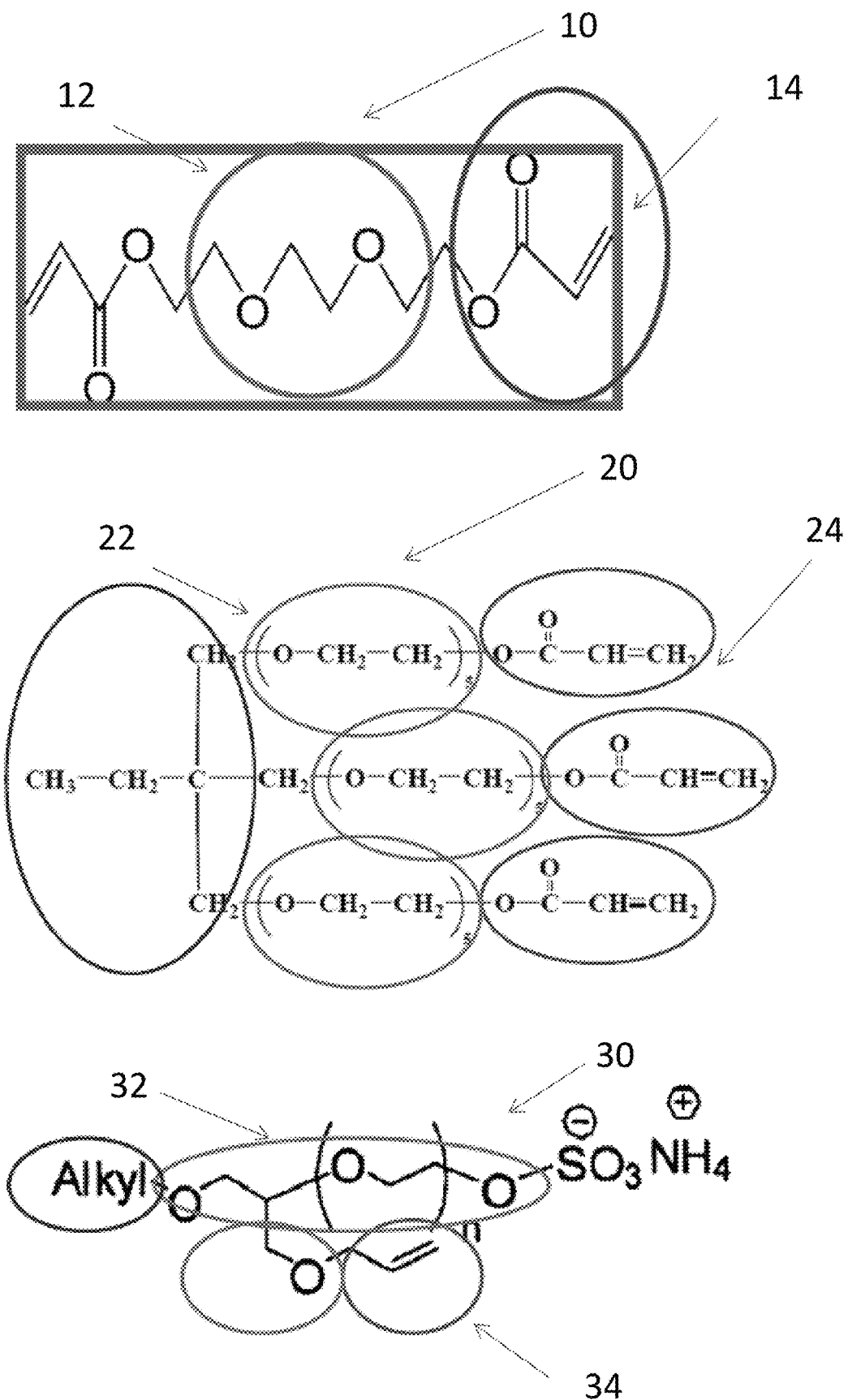

FOG RESISTANT COATINGS

RELATED APPLICATIONS

This Application claims the benefit of and priority to U.S. Provisional Application Ser. No. 62/291,882, filed Feb. 5, 2016, which is incorporated herein by reference in its entirety.

FIELD

The present disclosure relates to coatings with washable, anti-fog properties and, optionally, abrasion resistant properties. The present disclosure also relates to processes for making such coatings, processes for coating substrates with such coatings, and articles coated with such coatings.

BACKGROUND

Permanent anti-fog properties are desired in several applications such as ophthalmic and sun lenses; safety, military and sports eyewear and accessories; glazing for automotive, transportation, building and construction, greenhouses; industrial, point-of-sale and electronics displays; commercial refrigerators and freezer doors; mirrors; solar panels, and others.

Fogging occurs when the water vapor from surrounding air condenses on an article forming small water droplets. This happens when the article is at a lower temperature than that of the environment. Current anti-fog coatings usually form smooth surfaces that are hydrophilic in nature. Surfactants are used in the coating formulation to increase the surface energy of the cured coatings enabling the droplet to sheet instead of forming spherical droplets on the substrate. The resulting water sheeting effect minimizes the scattering of light thereby improving visibility.

In order to have long-lasting, or permanent, anti-fog performance, anti-fog coatings are typically formulated with large amounts of surfactants that can considerably lower the hardness of the coatings. However, oftentimes, the anti-fog coatings lose the anti-fog functionalities rather quickly, and need to be rejuvenated with additional surfactants. Moreover, the long-lasting anti-fog coatings available on the market today are principally thermally cured and thus require long cure times at elevated temperatures that can impact manufacturing cost and productivity of anti-fog article manufacturers. Additionally, many of these coatings do not have abrasion resistant properties. Accordingly, there is a need for new fast-curing anti-fog coatings with long-lasting anti-fog properties without the need for rejuvenation, and, optional, better abrasion resistant properties.

SUMMARY

The present disclosure provides fast-curing coating formulations with long-lasting anti-fog properties and optional abrasion resistant properties.

In some aspects, a coating composition is provided, the composition comprises one or more radiation-curable acrylates having hydrophilic regions comprising one or more hydrophilic alkoxylate groups, the one or more hydrophilic alkoxylate groups having the formula —(($CH_2$)nO-)m-, where n can be equal or greater than 1 and equal or less than 3 ($1<n<3$) and m can be equal or greater than 1 and equal or less than 10 ($1<m<10$); a reactive surfactant comprising a reactive moiety; and a photoinitiator, wherein, upon the exposure of the photoinitiator to light energy, the one or more radiation-curable acrylates are cured to form a hydrophilic network with the reactive surfactant being bound to the network by binding of the reactive moiety of the surfactant to one or more acrylate groups in the hydrophilic regions of the one or more radiation-curable acrylates.

In some aspects, a Ultra Violet (UV) curable coating composition is provided, the composition comprises: radiation-curable, multifunctional acrylates having hydrophilic regions comprising one or more hydrophilic alkoxylate groups, the one or more hydrophilic alkoxylate groups having the formula —(($CH_2$)nO-)m-, where n can be equal or greater than 1 and equal or less than 3 ($1<n<3$) and m can be equal or greater than 1 and equal or less than 10 ($1<m<10$); one or more reactive surfactants, wherein the reactive surfactants have one or more reactive groups comprising an alkenyl group, acrylate group, thiol group or a combination thereof; and a photoinitiator, wherein, upon the exposure of the photoinitiator to UV light energy, the one or more radiation-curable acrylates are cured to form a hydrophilic network with the reactive surfactant bound to the network by binding of the reactive moiety of the surfactant to one or more acrylate groups in the hydrophilic regions of the one or more radiation-curable acrylates. In some embodiments, the acrylates are mono, di, tri, or tetrafunctional or a combination thereof.

In some aspects, the coating compositions of the instant disclosure provide a transparent, washable anti-fog coating when applied to a substrate and cured. In some embodiments, the coating compositions of the instant disclosure further comprise metal oxide nanoparticles dispersed throughout the network to provide abrasion-resistant properties to the coating. In some embodiments, the coating compositions of the instant disclosure further comprise comprises a non-reactive surfactant.

In some aspects, the present disclosure provides a cured coating that comprises a hydrophilic network comprising one or more acrylates having hydrophilic regions comprising one or more hydrophilic alkoxylate groups, the one or more hydrophilic alkoxylate groups having the formula —(($CH_2$)nO-)m-, where n can be equal or greater than 1 and equal or less than 3 ($1<n<3$) and m can be equal or greater than 1 and equal or less than 10 ($1<m<10$); and a reactive surfactant comprising a reactive moiety, wherein the reactive surfactant is bound to the network by binding of the reactive moiety of the surfactant to one or more acrylate groups in the hydrophilic regions of the one or more radiation-curable acrylates. Such coating may further include metal oxide nanoparticles dispersed throughout the network, and may be an optically-transparent, abrasion-resistant, with washable anti-fog properties when applied to a substrate.

In some aspects, the present disclosure provides an article comprising a substrate and a transparent, water-washable anti-fog coating applied onto the substrate, wherein the coating comprises: a hydrophilic network comprising one or more acrylates having hydrophilic regions comprising one or more hydrophilic alkoxylate groups, the one or more hydrophilic alkoxylate groups having the formula —(($CH_2$)nO-)m-, where n can be equal or greater than 1 and equal or less than 3 ($1<n<3$) and m can be equal or greater than 1 and equal or less than 10 ($1<m<10$); and a reactive surfactant comprising a reactive moiety, wherein the reactive surfactant is bound to the network by binding of the reactive moiety of the surfactant to one or more acrylate groups in the hydrophilic regions of the one or more radiation-curable acrylates. The coating may further comprise metal oxide nanoparticles dispersed throughout the network.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein:

FIG. 1 provides non-limiting examples of curable resins and reactive surfactants suitable for use in some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. It will be understood that various changes may be made in the function and arrangement of elements without departing from the spirit and scope of the disclosure as set forth in the appended claims.

In some embodiments, the present disclosure provides coating compositions comprising (a) radiation-curable resins having a hydrophilic domain and a reactive group in the hydrophilic domain, and (b) reactive surfactants comprising one or more reactive groups that can react with the reactive groups in the hydrophilic domain of the polymers. In some embodiments, the compositions are liquid and are cured upon exposure to radiation. Upon cure, a hydrophilic network is formed with the reactive surfactant bound to the network due to the binding between the reactive groups of the resins and reactive surfactants. In some embodiments, such coating compositions provide an optically transparent, washable anti-fog coating when applied to a substrate and cured. In some embodiments, the coatings may be washable with water, soap, commercial cleaners and similar fluids, and still retain their fog resistant properties. In some embodiments, the composition may further include metal oxide nanoparticles that can impart abrasion-resistant properties to the coating, upon cure, while still retaining optical transparency and/or fog resistant properties. In some embodiments, when the instant coatings are applied to an optically transparent substrate (for example, Gentex PC lenses), the present coatings do not add haze to the lens. For example, in some embodiments, the ΔHaze, the difference in haze as measured using ASTM D1003 standard between coated and uncoated optically transparent substrate, is ~0.01%, thus indicating that the coating has no impact on haze.

In some embodiments, radiation curable coating compositions of the present disclosure may include hydrophilic alkoxylated acrylates as a curable or crosslinkable resin, which upon cure, form a hydrophilic network to which the reactive moiety of the reactive surfactant can bind. In some embodiments, the resins are curable upon exposure to UV light to decrease curing time of the compositions. The bonding of the reactive surfactant to the acrylate network may provide long lasting anti-fog properties to the present composition. Long lasting, washable anti-fog property may also be achieved by using minimal loading of the surfactant. In some embodiments, the instant compositions result in washable anti-fog coatings, that is, coatings that retain their anti-fog properties after being subjected to multiple washes, for example, at least 20 washes, according to various wash and wipe tests described below. The present disclosure further provides processes for making the coating compositions and methods of use of such compositions.

For example, some aspects of the present disclosure also provide articles coated with the coating compositions or cured coatings resulting from such compositions, and processes for coating substrates with the anti-fog coating compositions. In some embodiments, the instant coatings are optically transparent due to the selection of ingredients and are applied on an optically transparent substrate, such as lenses for eyeglasses. In some embodiments, the instant coatings may be utilized to manufacture an anti-fog freezer film to be applied to surfaces of a freezer or refrigerator, or may be directly coated on the surfaces of a freezer or refrigerator.

Curable Resins

In some embodiments, the curable resins of the present disclosure include various hydrophilic acrylates such as alkoxylated acrylates, glycidyl acrylates and the like. In some embodiments, such acrylates have one more hydrophilic regions or domains due to the presence of one or more groups of the following formula: $-((CH_2)_nO-)_m$. In some embodiments, n can be equal or greater than 1 and equal or less than 3 ($1 \leq n \leq 3$), m can be equal or greater than 1 and equal or less than 10 ($1 \leq m \leq 10$), or both. In some embodiments, n may be equal to 2. In some embodiments, m may be equal to 5. In this manner, suitable hydrophilic environment necessary for the anti-fog property may be provided.

The acrylates suitable for use with the instant compositions also include a reactive group that can react with a reactive group of the reactive surfactant, as described below. For example, such reactive group can comprise an acrylate group. In some embodiments, the reactive group may be located in the hydrophilic region of the acrylates and of network formed upon cure of the acrylates. For example, FIG. 1 presents a non-limiting example of suitable acrylates 10, 20 having hydrophilic regions 12, 22 (due to the presence of the alkoxylate group) and reactive groups 14, 24 in the hydrophilic regions 12, 22. The acrylates 10, 20 can form a network with hydrophilic regions, and a reactive surfactant 30 can bind or become tethered to the network in the hydrophilic regions of the network due to binding of a reactive group 34 to the reactive groups 14, 24 of the acrylates 10, 20. The surfactant 30 can also have a hydrophilic region 32 to enable the reactive surfactant to reside in the hydrophilic network domain so that the untethered side of the reactive surfactant can move freely to the surface of the network for anti-fog activity.

In some embodiments, one or more ethoxylated acrylates may be employed to form the network. In some embodiments, the acrylates may include one or more acrylates with mono, di, tri, or tetrafunctional groups. In some embodiments, the acrylates may include more than one type of acrylate monomer. In some embodiments, the network can be generated by use of multifunctional ethoxylated acrylate monomers. In some embodiments, ethoxylated diacrylates and ethoxylated triacrylates may be employed to form the network.

Examples of suitable hydrophilic diacrylate monomers include, but are not limited to, ethylene glycol diacrylate; ethylene glycol dimethacrylate; diethylene glycol diacrylate; triethylene glycol diacrylate; triethylene glycol dimethacrylate; tetraethylene glycol diacrylate; tetraethylene glycol dimethacrylate; polyethylene glycol diacrylate; tripropylene glycol diacrylate; triisopropylene glycol diacrylate; polypropylene glycol dimethacrylate; polyether diacrylates derived from Pluronic™ or Polaxamer™, and polyether diacrylates derived from reverse Pluroinc™.

Examples of suitable hydrophilic triacrylate monomers include, but are not limited to, ethoxylated trimethylolpropane triacrylate, propoxylated glyceryl triacrylate, propoxylated trimethylolpropane triacrylate, and tris(2-hydroxyethyl) isocyanurate triacrylate.

Examples of suitable hydrophilic tetraacrylate monomers include, but are not limited to, ethoxylated pentaerythritol tetraacrylate.

Reactive Surfactants

As described above, the reactive surfactants of the present compositions may comprise hydrophilic regions and may also include reactive moieties or groups capable of reacting with the reactive groups of the crosslinkable resins. Such reactive moieties may include, but are not limited to, one or more of an alkenyl group, an acrylate group, a thiol group or combination thereof. It should be noted that the surfactant may be allowed to react with one or more reactive moieties either prior to adding the product of the reaction to the acrylate mix or the surfactant and the reactive moiety can be added to the acrylate mix at the same time. In some embodiments, the reactive moieties may be located in a hydrophilic region or domain of the reactive surfactant.

A representative reactive surfactant with an alkenyl reactive group may have a general chemical formula of: $(CH_2=CH)-R$, where R can be selected from ether sulfonates, phosphoric acid esters, polyethers and copolymers thereof, nonionic polyethers, alkyl ethers, alkenyl ethers, and olefinic ethers, as shown in Table 1. Illustrative examples of reactive surfactants having hydrophilic segments with reactive double bond include, but are not limited to, Reasoap SR10, Reasoap SR20, Reasoap ER10, Reasoap PP70, Emulsogen APS100. Additional non-limiting examples of reactive surfactant with an alkenyl reactive group are presented in Table 1 below.

TABLE 1

| Compound | Description |
|---|---|
| 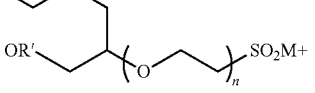 | Ether sulfonates (R' can be alkyl, aryl or other) n = 10, 11, . . . M⁺ = metal or ammonium counterion |
| 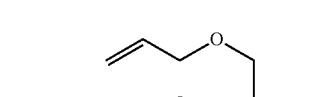 | |
| 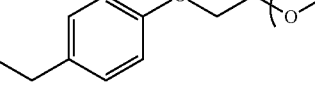 | Phosphoric acid ester n = 10, 11, . . . |
| 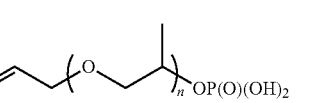 | Nonionic polyether surfactant (R' can be alkyl, aryl or other) n = 10, 11, . . . |
| 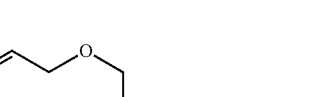 | |
| 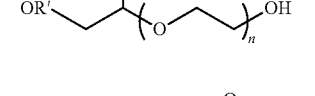 | Polyether sulfates n = 4, 5, . . . m = 10, 11, . . . M⁺ = metal or ammonium counterion |

TABLE 1-continued

| Compound | Description |
|---|---|
| HO–(–O–)ₗ–(–=–)–(–O–)ₘ–(–)ₙ | Polyether copolymer<br>l = 1, 2, . . .<br>n = 1, 2, . . .<br>m = 1, 2, . . .<br>p = 1, 2, . . . |
| OH–(–O–)ₗ–C(=O)–O–(–O–)ₘ–(–=–)–(–O–)ₙ with (–)ₚ branch | |

A representative reactive surfactant with an acrylate reactive group may have a general chemical formula of: $(CH_2=CHCOO)-R$, where R can be selected from ether sulfonates, phosphoric acid esters, polyethers and copolymers thereof, as shown in Table 2. Illustrative examples of surfactants having hydrophilic segments with reactive acrylate moiety include, but are not limited to, metal salts of sulfopropylacrylic acid, and alkylacryloxyethyl trialkylammonium salts. Additional non-limiting examples of reactive surfactant with an acrylate reactive group are presented in Table 2 below.

TABLE 2

| Compound | Description |
|---|---|
| Acrylate–O–CH₂–(–O–)ₙ–SO₃M+ | Ether Sulfonate<br>n = 10, 11, . . .<br>M+ = metal or ammonium counterion |
| Acrylate–(–O–)ₙ–OP(O)(OH)₂ | Phosphoric acid ester<br>n = 1, 2, . . . |

TABLE 2-continued

| Compound | Description |
|---|---|
| Methacrylate–(–O–)ₙ–N(CH₃)₃SO₃CH₃ | Polyethers<br>n = 10, 11, . . . |
| Acrylate–(–O–)ₙ–(–O–)ₘ–OH | Non-ionic Polyether Copolymers<br>n = 1, 2, . . .<br>m = 1, 2, . . . |

A representative reactive surfactant with a thiol reactive group may have a general chemical formula of: $(SH)-R$, where R can be selected from ether sulfonates, phosphoric acid esters, polyethers and copolymers thereof, as shown in Table 3. In some embodiments, a surfactant having hydrophilic segments with reactive thiol moiety can be obtained by reacting Trimethylolpropane tris (3-mercaptoproprionate) (TMPTMP) with Reasoap SR10 via thiol-ene reaction. (see Premix 3). In some embodiments, a surfactant having hydrophilic segments with reactive thiol moiety can be obtained by reacting Pentaerythritol tetrakis(3-mercaptoproprionate) with Reasoap SR10 via thiol-ene reaction. Additional non-limiting examples of reactive surfactant with a thiol reactive are presented in Table 3 below.

TABLE 3

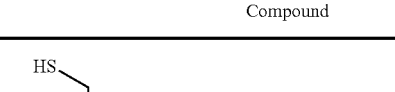

Ether sulfonates
(R' can be alkyl, aryl or other)
n = 10, 11, . . .
M+ = metal or ammonium counterion

TABLE 3-continued

| Compound | Description |
|---|---|
| (structure: pentaerythritol tris(3-mercaptopropionate) derivative with thioether-linked polyether chain terminating in $OP(O)(OH)_2$) | Phosphoric acid ester<br>n = 1, 2, ... |
| (structure: pentaerythritol tris(3-mercaptopropionate) derivative with thioether-linked polyether block copolymer chain terminating in OH) | Non-ionic Polyether Copolymers<br>n = 1, 2, ...<br>m = 1, 2, ... |

In some embodiments, the reactive segments of the reactive surfactant react with hydrophilic domains of the acrylates during the curing process. In this manner, upon curing, the reactive surfactant may be able to bind to the cured acrylate network and thus remain in place (not washed off or otherwise removed) to provide the coating with long-lasting anti-fog properties.

Metal Oxide Particles

In some embodiments, the present compositions may include metal oxide particles dispersed throughout the network of hydrophilic crosslinkable resins, for example, acrylates. The metal particles may provide hardness and abrasion resistant properties to the coatings. Suitable examples of metal oxide nanoparticle include, but are not limited to, silica particles, titania, alumina, zinc oxides, antimony oxide, tin oxide, zirconium oxides, and combinations thereof. In some embodiments, the size and concentration of the metal nanoparticles can be selected such that the resulting coatings are optically transparent, while still retaining their fog resistant properties and anti-abrasion properties. In some embodiments, the metal oxide particles are nanoparticles with sizes ranging from about 5 to about 50 nm. In some embodiments, the metal oxide particles are nanoparticles with sizes ranging from about 10 to about 20 nm. The nanoparticles may be present in the concentration between 0 and 80% by weight.

Non-Reactive Surfactants

In some embodiments, non-reactive surfactants may be added to the coating composition to further enhance anti-fog property. Suitable non-reactive surfactants include, but are not limited to, sulfonic acid salts, ammonium salts, phosphate salts, polyethylene glycol ether oligomers, hydrophilic polyacrylates, octophenoxypolyethoxyethanols, and non-ionic polyether block copolymers. In some embodiments, the concentration of non-reactive surfactant in the composition may range between 0 and 10% by weight. In some embodiments, the concentration of non-reactive surfactant in the composition may range between 0.5 and 2% by liquid weight.

Photoinitiators

In some embodiments, the composition may include one or more photoinitiators to initiate curing of the compositions upon exposure to radiation or light. The one or more photoinitiators present in the coating composition initiates and advances the crosslinking of the curable resins, i.e, curing of the coating composition when the coating composition is exposed to radiation. In some embodiments, the photoinitiators may be selected to react when exposed to UV light or visible light. In some embodiments, the photoinitiators are blue light photoinitiators. In some embodiments, to cure the composition, cumulative UV-A exposure can be between 1.0 and 2.5 $J/cm^2$ when using an H bulb for an exposure bulb for one minute.

Examples of suitable UV radiation sensitive photoinitiators or blends of initiators used in coating compositions disclosed herein include, but are not limited to, benzoin; substituted benzoins such as butyl isomers of benzoin ethers; benzophenone; substituted benzophenones such as hydroxy benzophenone; 2-hydroxyethyl-N-maleimide; 2-[2-hydroxyethyl(methyl)amino]ethanol anthraquinone; thioxanthone; $\alpha,\alpha$-diethoxyacetophenone; 2,2-dimethoxy-1,2-diphenylethan-1-one; 2-hydroxy-2-methyl-1-phenyl-propan-1-one; diphenyl(2,4,6-trimethylbenzoyl)phosphine oxide, phenyl glyoxylic acid methyl ester; 1-hydroxylcyclohexyl phenyl ketone; 2-benzyl-2-dimethylamino-1-(4-morpholinophenyl)-butanone-1; 2-dimethylamino-2-(4-methylbenzyl)-1-(4-morpholin-4-yl-phenyl)-butan-1-one; 2-methyl-1-[4-(methylthio)phenyl]-2-morpholinopropan-1-one; and 1-[4-(2-hydroxyethoxy)-phenyl]-2-hydroxy-2-methyl-1-propane-1-one. Cationic photoacid generators may include but are not limited to diphenyl[3-(phenylsulfanyl)phenyl]sulfonium hexafluorophosphate; diphenyl[2-phenylsulfanyl)phenyl]sulfonium hexafluoroantimonate; mixtures of triarylsulfonium with hexafluoroantimonate of hexafluorophosphate salts in propylene carbonate; and diaryl iodonium salts with pentafluoroborate, hexafluoroantimonate or hexafluorophosphate.

Optionally, photoinitiator synergists are employed as coinitiators in conjunction with acyl ketone photoinitiators such as, for example, benzophenone. Suitable photoinitiator synergists include, for example, N-methyl-diethanol amine, triethanolamine 2-(butoxy)ethyl-4-dimethyaminobenzoate and reactive amine acrylates commercially available as EBECRYL P104, EBECRYL P105, and EBECRYL 7100 from UCB Radcure Chemicals Corporation, Smyrna, Ga. or CN 371, CN 373, CN 384, or CN 386 available commercially from Sartomer Company, Inc., Exton, Pa. Sartomer describes CN 373 as a reactive amine acrylate coinitiator that can be used in combination with a hydrogen abstracting photoinitiator, such as benzophenone or isopropyl thioxanthone (ITX), to promote free radical polymerization. CN 373 accelerates surface cure speed and helps overcome oxygen inhibition in UV curable coatings and inks. Sartomer describes CN 371, CN 384, CN 386, CN 550, and CN551 as di- and tri-functional amine acrylate coinitiators which, when used in conjunction with a photosensitizer, such as benzophenone, promote rapid curing under UV light.

In some embodiments, the composition may include a visible light photoinitiator to initiate curing of the composition upon exposure to blue light (400-500 nm). Such photoinitiators may include, but are not limited to, camphorquinone, phenylpropanedione (PPD), bisacrylphosphine oxide (Ir819), include 2,4,6-trimethylbenzoyldiphenylphosphine oxide (TPO), 2,4,6-trimethylbenzoylethoxyphenylphosphine oxide (TPO-L), and bis(2,4,6-trimethylbenzoyl)phenylphosphine oxide (BAPO).

In some embodiments, the photoinitiators can be selected from a family of alpha hydroxyl ketone photoinitiators. In some embodiments, the photoinitiators comprises one or more of Irgacure 500 (50% Benzophenone+50% 1-hydroxy-cyclohexyl-phenyl ketone) and Darocure 1173 (2-hydroxy-2-methyl-propiophenone).

The coating formulation may be alternatively cured using electron beam (EB) radiation with minimal to no use of photoinitiators.

Flow Modifiers/Leveling Agents

In some embodiments, the coating compositions disclosed herein can include a leveling agent. The leveling agent, which may also be known as a flow-control agent, may be incorporated into the coating compositions described herein to spread the composition more evenly or level on the surface of the substrate and to provide substantially uniform contact with the substrate. The amount of the leveling agent can vary widely but preferably is used in an amount ranging from about 0.001% to about 10% leveling agent by weight solids of the coating composition. Any conventional, commercially available leveling agent which is compatible with the coating composition and the substrate, which is capable of leveling the coating composition on a substrate, and which enhances wetting between the coating composition and the substrate is employed. Non-limiting examples of such leveling agents include polyethers, silicones, fluorosurfactants, polyacrylates, silicone polyacrylates such as silicone hexaacrylate, and fluoro-modified polyacrylates. Examples include TRITON X-100, X-405, and N-57 from Rohm and Haas, silicones such as Paint Additive 3, Paint Additive 29, and Paint Additive 57 from Dow Corning, SILWET L-77 and SILWET L-7600 from Momentive (Columbus, Ohio), and fluorosurfactants such as FLUORAD FC-4430 from 3M Corporation (St. Paul, Minn.).

Other Additives

Other ingredients such as an antioxidant, antistatic agent, weather resistive agent, tint additive, UV stabilizer, dispersing agent, defoamer, heat stabilizer, may also be added to the coating formulation. Examples of antioxidants include octadecyl-3-(3,5-di-tertbutyl-4-hydroxyphenyl) propionate, and pentaerythrityltetrakis[3-(3,5-di-tert-butyl-4-hydroxyphenyl)propionate].

Examples of heat stabilizers include triphenyl phosphite, tris-(2,6 dimethylphenyl)phosphite, tris-(2,4-di-t-butyl-phenyl)phosphite, tris-(mixed mono- and di-nonylphenyl)phosphite, dimethylbenzene phosphonate and trimethyl phosphate. Examples of the antistatic agent include glycerolmonostearate, sodium stearyl sulfonate, and sodium dodecylbenzenesulfonate.

Polycarbonates (PC) are known to degrade under the exposure of ultraviolet (UV) light. This process is known as weathering. A weatherable material can maintain its physical properties for a prolonged time under the UV exposure. In order to improve service life under UV exposure, a UV absorber may be used in the coating for polycarbonate and similar aromatic plastic substrates. UV absorbers include, but are not limited to, three groups of chemicals: 1) 2-hydroxy-benzophenones (BP) derivatives, commercial examples include, but are not limited to, Chimassorb® 81 and Chimassorb® 90 (both from BASF, Germany); 2) 2-(2-hydroxyphenyl)-benzotriazole (HPBT) derivatives, commercial examples include, but are not limited to, Tinuvin® 1130, Tinuvin® 384-2, Tinuvin® 928 and Tinuvin® 900 (all from BASF, Germany); 3) 2-hydroxyphenyl-s-triazines (HPT) derivatives, commercial examples include, but are not limited to, Tinuvin® 400, Tinuvin® 405 (both from BASF, Germany).

Hindered amine light stabilizers (HALS) are also used for effective stabilization against the detrimental effects of light and weathering. The most widely used hindered amine light stabilizers (HALS) are mainly derivatives of 2,2,6,6-tetramethyl piperidine. Commercial examples include, but are not limited to, Tinuvin® 152, Tinuvin® 292 (both from BASF, Germany).

Exemplary Compositions

The concentration of the acrylates in the present composition may range between about 4% and 95% by weight. In some embodiments, the concentration of the acrylates in the present composition may range between 7% and 55% by weight of liquid coating. In some embodiments, the concentration of the reactive surfactant may range between 0.5% and 30% by weight of liquid coating. In some embodiments, the weight ratio between the acrylates and the reactive surfactants can be between 3:1 and 95:1. In some embodiments, the concentration of non-reactive surfactant in the composition may range between 0.5 and 2% by liquid weight. In some embodiments, the composition may include silica particles.

In some embodiments, the acrylates comprise a mixture of one or more ethoxylated diacrylates and one or more ethoxylated triacrylates. In some embodiments, the diacrylates may comprise triethylene glycol diacrylate. In some embodiments, the triacrylates may comprise ethoxylated trimethylolpropane triacylate. In some embodiments, the ratio between the diacrylates and triacrylates may range between 1:3 to 1:7. In some embodiments, to enhance hydrophilic properties of the network, the network may be essentially or completely free of non-hydrophilic acrylates. In some embodiments, the network may lack non-hydrophilic acrylates or acrylates with hydrophobic regions. In some embodiments, the composition may further include a reactive surfactant with an alkenyl reactive group, but surfactants with an acrylate group, a thiol group or combination of these 3 groups may be used. In some embodiments, the reactive surfactant is an anionic surfactant. The instant compositions may further include metal oxide particles, such as silica, to impart hardness and abrasion resistance properties to the instant coatings. In addition, the instant compositions may include one or more of the following: non-reactive surfactant, solvent, photo initiators, and flow modifiers.

By way of non-limiting examples, the present disclosure provides compositions having the following ratios (by dry weight) of one or more of silica, diacrylate and triacrylate:

In some embodiments, the composition may include between about 15 and about 50% weight of diacrylate, and, optionally between about 5 and about 60% weight of diacrylate, and between about 50 and about 85% weight of triacrylate, and, optionally between about 40 and about 100% weight of triacrylate.

In some embodiments, the composition may include between about 50 and about 70% of metal oxide particles, and, optionally between about 15 and about 80% weight of metal oxide particles, and between about 30 and about 50% weight of triacrylate, and, optionally between about 20 and about 85% weight of triacrylate.

In some embodiments, the composition may include between about 50 and about 71% weight of metal oxide particles, and, optionally between about 30 and about 80% weight of metal oxide particles; between about 4 and about 25% weight of diacrylate, and, optionally between about 4 and about 30% weight of diacrylate, and between about 20 and about 50% weight of triacrylate, and, optionally between about 16 and about 70% weight of triacrylate.

By way of non-limiting examples, the present disclosure provides the following compositions:

In some embodiments, the composition may include between about 4 and about 35% weight of diacrylate in the overall coating, and in some embodiments, optionally between about 2 and about 45% weight of diacrylate; between about 15 and about 60% weight of triacrylate in the overall coating, and, optionally between about 10 and about 75% weight of triacrylate; and between about 0.5 and about 2% weight of reactive surfactant, and, optionally between about 0.5 and about 30% weight of reactive surfactant. In some embodiments, the composition may also include one or more of the following: between about 0.5 and about 2% weight of non-reactive surfactant, and, optionally between about 0.5 and about 10% weight of non-reactive surfactant; between about 40 and about 65% weight of solvent, and, optionally between about 40 and about 70% weight of solvent; and between about 1 and about 4% weight of photo initiator and flow modifier, and, optionally between 0.5 and about 5% weight of photo initiator and flow modifier.

In some embodiments, the composition may include between about 15 and about 50% weight of metal oxide particles in the overall coating, and, optionally between about 5 and about 60% weight of metal oxide particles; between about 9 and about 35% weight of triacrylate in the overall coating, and, optionally between about 5 and about 60% weight of triacrylate; and between about 0.5 and about 2% weight of reactive surfactant, and, optionally between about 0.5 and about 30% weight of reactive surfactant. In some embodiments, the composition may also include one or more of the following: between about 0.5 and about 2% weight of non-reactive surfactant, and in some embodiments, optionally between about 0.5 and about 10% weight of non-reactive surfactant; between about 40 and about 65% weight of solvent, and in some embodiments, optionally between about 30 and about 70% weight of solvent; and between about 1 and about 4% weight of photo initiator and flow modifier, and in some embodiments optionally between 1 and about 5% weight of photo initiator and flow modifier.

In some embodiments, the composition may include between about 15 and about 50% weight of metal oxide particles in the overall coating, and, optionally between about 5 and about 70% weight of metal oxide particles; between about 1 and about 20% weight of diacrylate in the overall coating, and, optionally between about 1 and about 30% weight of diacrylate; between about 6 and about 35% weight of triacrylate in the overall coating, and, optionally between about 4 and about 50% weight of triacrylate; and between about 0.5 and about 2% weight of reactive surfactant, and, optionally between about 0.5 and about 30% weight of reactive surfactant. In some embodiments, the composition may also include one or more of the following: between about 40 and about 65% weight of solvent, and in some embodiments, optionally between about 10 and about 70% weight of solvent; and between about 1 and about 4% weight of photo initiator and flow modifier, and in some embodiments optionally between 1 and about 5% weight of photo initiator and flow modifier.

In some embodiments, the composition may include between about 15 and about 50% weight of metal oxide particles in the overall coating, and in some embodiments, optionally between about 5 and about 70% weight of metal oxide particles; between about 1 and about 20% weight of diacrylate in the overall coating, and in some embodiments, optionally between about 1 and about 30% weight of diacrylate; between about 6 and about 35% weight of triacrylate in the overall coating, and in some embodiments, optionally between about 4 and about 50% weight of triacrylate; between about 0.5 and about 2% weight of reactive surfactant, and in some embodiments, optionally between about 0.5 and about 30% weight of reactive surfactant. In some embodiments, the composition may also include one or more of the following: between about 0.5 and about 2% weight of non-reactive surfactant, and in some embodiments, optionally between about 0.5 and about 10% weight of non-reactive surfactant; between about 40 and about 65% weight of solvent, and in some embodiments, optionally between about 10 and about 70% weight of solvent; and between about 1 and about 4% weight of photo initiator and flow modifier, and in some embodiments optionally between 1 and about 5% weight of photo initiator and flow modifier.

Substrates/Articles

The coating compositions disclosed herein can be applied as a coating to rigid or flexible substrates. Suitable substrate materials include, but are not limited to, transparent plastics such as polycarbonate (PC), polarized polycarbonate, polyamide, polyacrylic, polymethylmethacrylate (PMMA), polyvinylchloride, polybisallyl carbonate, allyl diglycol carbonate (ADC) polymer, polyethylene terephthalate (PET), polyethylene naphthenate, cellulose triacetate (CTA) polymer, cellulose acetate butyrate (CAB) polymer, polyurethane, polyepisulfide, and polythiourethane. Other substrates including various polyolefins, fluorinated polymers, metals and glass, such as soda-lime glass, borosilicate glass, acrylic glass among other types of glass, can be used with appropriate pretreatments, if necessary. Examples of articles that may be coated with coatings of the present disclosure include, but are not limited to, safety eyewear, optical lenses, goggles, face shields, face plates for helmets, glazing used as windows in buildings, and glazing used as windshields or windows in automotives, buses, trains, airplanes, and other transportation vehicles, multifunctional LED, LCD displays, bathroom mirrors, shower mirrors and fixtures. Coating may also be applied to commercial freezer doors, ice cream freezer doors and deli cases. In some embodiments, to increase adhesion of the present composition to the substrates, the substrates may be subjected to surface treatments and/or coated with primers. In some embodiments, acrylate-based primers may be used, particularly with PMMA substrates.

Additionally, the coated articles prepared by coating the disclosed compositions on thin flexible substrates like PC or PET film can further be mounted/applied to the articles that require anti-fog functionality for example safety eyewear, optical lenses, goggles, face shields, face plates for helmets, glazing used as windows in buildings, and glazing used as windshields or windows in automotives, buses, trains, airplanes, and other transportation vehicles, multifunctional LED, LCD displays, bathroom and shower mirrors. The anti-fog flexible films can also be applied via a repositionable optically transparent adhesive, such as a pressure sensitive adhesive, to commercial freezer doors, ice cream freezer doors and displays, deli cases to prevent frost formation and fogging.

The coating compositions described herein can be applied in any suitable manner to a substrate. For example, the compositions of the present disclosure can be applied to solid substrates by conventional methods, such as flow coating, spray coating, curtain coating, dip coating, spin coating, slot-die coating, roll coating, and the like to form a continuous surface film on the substrate. The coating compositions are then cured by exposing the coated substrate to UV radiation provided by UV lamps, visible light radiation provided by visible light lamps or, in some embodiments, EB radiation provided by EB accelerators, or a combination of these, all of these techniques being known to those skilled in the art. Additionally, the coated articles prepared by coating the disclosed compositions on thin flexible substrates like PC or PET film can be installed or retrofitted via dry or wet lamination on rigid substrates.

In some embodiments, a method of providing an article with washable anti-fog properties comprises treating a surface of an article and applying to the surface a washable anti-fog coating of the present disclosure, where the coating can further be optically transparent, abrasion resistant, or both.

EXAMPLES

The following examples are merely representative and should not be used to limit the scope of the present disclosure. A large variety of alternative designs exists for the methods and compositions disclosed in the examples. The selected examples are therefore used mostly to demonstrate the principles of the devices and methods disclosed herein.

Description of Tests:

Film Thickness: Film thickness of cured coating was measured with a Filmetrics F20-CP Spectrophotometer at wavelength of 632.8 nm based on spectral reflectance methodology.

Haze: Light transmission and light-scattering properties of the cured coating was evaluated by measuring haze according to ASTM D1003 standard with a Haze-gard Plus Hazemeter (BYK-Gardner, Columbia, Md.).

Yellow Index: Yellow index was measured on a Shimadzu UV-1601 UV-Vis spectrophotometer (Shimadzu Scientific Instruments of Kyoto, Japan) in accordance to ASTM E-313.

Adhesion: Adhesion is the ability of a coating to adhere to a substrate. The initial adhesion was tested using a roll of pressure sensitive tape 3M Brand SCOTCH™ 600 tape. The test was carried out as follows: 1) a cross-hatch of a 5×5 grid, approximately 2 mm apart was made with a retractable razor blade into the cured coating; 2) the tape was pressed down firmly (using a tongue depressor) over the cross-hatched area; 3) After 90±30 s, tape was pulled at an angle of 180° or as close to substrate as possible; 4) a check for the removal of the coating was made by examination of the coated substrate using appropriate visual control; 5) the subject area was also inspected under a microscope; 6) the actual count of unaffected areas was reported as percent adhesion (when adhesion was affected along a line only, the estimate is converted into percentages).

Boiling Water Adhesion: The adhesion was also tested in the same manner as above for certain samples after the coated specimen was soaked in boiling water for 1 hour.

Steel Wool Abrasion: Steel wool abrasion measured by YT-520 Steel Wool Tester gives qualitative determination of abrasion/scratch resistance of coated materials upon rubbing with standardized grades of steel wool. Japanese steel wool grade 0000 (Extra fine) was used for the test. The coated surface was rubbed by the machine in about 2"×2" area for 10 strokes. The test is initiated with a weight of 50 g. If the coating does not develop scratches, the weight is increased to 100 g. Thus the weight is incrementally increased until scratches are observed on the coating. For example a cured coating with steel wool resistance rating of 200 g, shows scratches at a minimum load of 200 g.

Bayer Abrasion Test: Bayer abrasion test is a quantitative measure of the abrasion resistance of a coated specimen relative to that of an uncoated CR39 standard. The test was carried out in a Colts Laboratory BTE Abrasion Tester using 500 g of Norton ZF#12 Alundum abrasion media. Uncoated Silor Optical CR-39 Plano lenses were used as standard. After 600 strokes, the change in haze of coated specimen and CR39 standard were noted. Bayer ratio was reported as percentage difference in haze of uncoated CR39 standard divided by the percentage difference in haze of coated specimen.

Taber Test: The Taber Abrasion test was performed with a Teledyne Model 5155 Taber Abrader (Taber Industries, North Tonawanda, N.Y.) with a 500 g auxiliary load weight and with CS-10F wheels (Taber Industries, North Tonawanda, N.Y.). Prior to the measurement, the wheels were refaced with the ST-11 refacing stone (Taber Industries, North Tonawanda, N.Y.). The refacing was performed by 25 revolutions of the CS-10F wheels on the refacing stone. The initial haze of the sample was recorded 4 times with a Haze-gard Plus (BYK-Gardner, Columbia, Md.) equipped with a Taber Abrasion holder (BYK-Gardner, Columbia, Md.). After 100 cycles of the CS-10F wheels on the sample, the haze was recorded again 4 times with a Haze-gard Plus (BYK-Gardner, Columbia, Md.) equipped with a Taber Abrasion holder (BYK-Gardner, Columbia, Md.). The average haze was then determined for the initial haze reading and the haze reading after 100 cycles using the CS-10F wheels. The difference between the averaged haze readings at 100 cycles and the initial haze reading is then reported.

Anti-Fog Properties

Breath Test: Breath test was carried out by holding the coated substrate about 2.5 to 7.5 cm from the tester. The tester blew on the sample so as to intentionally create fog. If no fog appeared on the coated substrate during the test, the coating composition passed the breath test. If fog appeared on the surface, then the coating composition failed this test.

Initial Anti-fog Test: Initial anti-fog test was carried out by positioning a coated substrate at a standard height (1") above a beaker containing a source of 60° C. water. The coated substrate was exposed to water vapor from the 60° C. water for 1 minute. If fog appeared on the coated substrate during this test, the time taken for the appearance of the fog was recorded. If no fog appeared during 1 minute of exposure, then the coating was considered to "pass" the initial anti-fog test.

Water Soak Anti-fog Test: A coated substrate was soaked in water at room temperature for 1 hour. The coated specimen was then removed from the water, suspended on a rack at 25° C., 50% RH for 12 hours and tested for anti-fog property by placing the coated substrate above beaker containing water at 50° C. for 1 minute. If fog appeared on the coated substrate during this test, the time taken for the appearance of the fog was recorded. If no fog appeared during 1 minute of exposure, then the coating was considered to "pass" the 1 h water soak anti-fog test.

In addition the anti-fog property of 12 h conditioned water-soaked coated specimens was tested using a YT-810 Resistance to Fogging Tester (manufactured by Yin-Tsung Co., Ltd) according to the EN166/EN168 protocol. The test involves placing the coated substrate onto the tester. When the test is started, the coated substrate is exposed to 50° C. steam, and a laser is passed through the lens. The amount of fogging was determined by reduction in the transmission of the laser light over 8 seconds (s) of exposure. The coating fails the fog test if the laser transmission falls below 80% of the initial reading during the 8 s period, if not, it is rated as a pass.

Anti-Fog after Wipe Tests

Dry cloth wipe test—The coated substrate was wiped with a dry microfiber cloth twenty times. After the 20 wipes, the anti-fog properties were evaluated by both the breath test and the 60° C. beaker test for one minute. If both tests pass, the coated substrate is considered to pass the dry cloth wipe anti-fog test.

IPA wipe test—A microfiber cloth was soaked with isopropyl alcohol and then wiped across the coated surface once. After the wipe, the anti-fog properties were evaluated by both the breath test and the 60° C. beaker test. This constitutes one IPA wipe cycle. If the coated substrate passes both tests, it is allowed to dry for thirty minutes and retested. The number of cycles completed without fogging is reported.

Wet cloth wipe test—A microfiber cloth was soaked in water. The coated substrate was wiped with wet cloth ten times. After 10 wipes the coated specimen was allowed to dry for one minute and tested for anti-fog property by the breath test and the 60° C. beaker test. This constitutes one wet cloth wipe cycle. If the coated substrate passes both tests, it is conditioned for 24 h at 25° C. and 50% RH and retested. The number of cycles completed without fogging is reported.

Anti-Fog after Wash Tests

Running water Wash test—The coated substrate is placed under running tap water and wiped with a wet microfiber cloth across the surface twenty times. After 20 wipes, the coated part was allowed to dry for 30 minutes at ambient conditions. It was then tested by the breath test and 60° C. beaker test. This constitutes one water wash cycle. If the coated substrate passes both tests, it is equilibrated at 25° C., 50% RH for 24 h and retested. The number of cycles completed without fogging is reported.

Soap and running water Wash test—The coated part was wiped once with a 1 wt % solution of 'Simple Green' cleaner in water, then placed under running tap water and wiped twenty times with a wet microfiber cloth. After 20 wipes, the coated sample was allowed to dry for 1 hour at ambient conditions. The sample was then tested for anti-fog property by breath test and 60° C. beaker test. This constitutes one soap water wash cycle. If the coated substrate passes both tests, it is conditioned for 24 h at 25° C., 50% RH and then retested. The number of cycles completed without fogging is reported.

The wipe and wash cycles are summarized in Table 4 below.

TABLE 4

| | | Initial Test | | |
|---|---|---|---|---|
| | Test name | Method | Time before testing Anti-fog | Duration between Cycles |
| Wipe tests | Dry cloth wipe test | 10 wipes with a dry cloth | Immediate | — |
| | IPA wipe test | 1 wipe with an IPA soaked cloth | Immediate | 30 minutes |
| | Wet cloth wipe test | 10 wipes with a water soaked cloth | 1 minute | 24 hours |
| Wash tests | Running water test | 20 wipes with a cloth under running tap | 30 minutes | 24 hours |
| | Soap/running water test | 1 wipe with a soapy cloth, followed by 20 wipes under running tap | 1 hour | 24 hours |

Wash and Wipe Test (Machine): The washability tester (AB5005 Automatic Washability Test, TQC Thermimport Quality Control, Capelle aan den Ussel, the Netherlands), consists of an mechanical device onto which a sponge is mounted on a holding arm, with a weight applied, to equal 300 g of force applied to the tested material. Tested material was coated primed PET films. During testing, the sponge was repeatedly moved across the surface of the tested material for a specified number of cycles, in the disclosed testing 1000 and 5000 cycles. While the sponge moved across the surface, a liquid is applied to the surface at a rate of 0.3 ml/min. Liquids tested included deionized water, ammonia free Windex, and formula 409 cleaner. After the specified cycles were completed, the tested material was dried by wiping with paper towels, and then tested for anti-fog performance. If the material passes anti-fog testing after washing, then the coating is determined to retain anti-fog performance after the specified number of wipes. If immediate anti-fog testing fails, the time required for anti-fog recovery is noted. If anti-fog performance does not return, the coating would be determined to have failed permanent anti-fog.

Freezer Test: Only samples coated on 125 um thick polycarbonate film were tested. The coated film was affixed to a glass insulated passive freezer door with double-sided tape. The freezer was set to specified temperature and the system was allowed to equilibrate for at least 1 hour. The door was opened at least 60°. A coating passes the test if it remains fog-free for at least 6 seconds. The external ambient temperature and relative humidity were recorded.

An "average freezer use" simulation was performed on a passive freezer that was set to −12.2° C. The door was opened every 10 minutes for a 6-second duration up to 1 hour. The length of time for fog to clear was measured and the percent (%) fog of individual coated articles were measured. Ambient room temperature was 20.9° C., relative humidity 53.4%.

The following is a description of the abbreviations of chemicals and other materials referred to in the application: MEK-AC-2140Z: Colloidal silica dispersion in methyl ethyl ketone (Nissan Chemical America Corporation); PGM-AC-2140Y: Colloidal silica dispersion in 1-methoxy-2-propanol (Nissan Chemical America Corporation); TMPTMP: Trimethylolpropane tris (3-mercaptoproprionate) (Aldrich); SR272: Triethylene glycol diacrylate (Sartomer Americas); SR454: Ethoxylated (3) trimethylolpropane triacrylate (Sartomer Americas); SR499: Ethoxylated (6) timethylolpropane triacrylate (Sartomer Americas); SR9035: Ethoxylated (15) trimethylolpropane triacylate (Sartomer Americas); SR415: Ethyoxylated (20) trimethylolpropane triacrylate (Sartomer Americas); 3-EGA: Triethylene glycol diacrylate (Kyoeisha); REASOAP SR-10: Reactive anionic ether sulfate surfactant (Adeka); REASOAP SR-20: Reactive anionic ether sulfate surfactant (Adeka); REASOAP ER-10: Reactive non-ionic ether surfactant (Adeka); Emulsogen APS-100: Non-ionic APEO-free ammonium salt of allyl polyakylene glycol ether sulfate (Clariant); Igepal CA-720: Polyoxyethylene (12) isooctylphenyl ether (Sigma Aldrich); Brij 30: Polyoxyethylene(4)lauryl ether (ACROS Organics); Brij 58: Polyoxyethylene glycol hexadecyl ether (ACROS Organics); OT-75: Sodium dioctyl sulfosuccinate (75% in water and alcohol), (Cytec Industries, Inc.); Schercoquat IAS-PG: Isosteramidopropyl ethyldimonium ethosulfate and propylene glycol (Lubrizol); PM: 1-Methoxy-2-Propanol; TMPTA: Trimethylolpropane triacrylate; NPC-ST-30: Organo SiO2 (Nissan Chemical America Corporation); Pelex OT-P: Bis(2-ethylhexyl)sulfsuccinate docusate sodium (Kao Corp.); Witcobond 240: Aqueous Polyurethane Dispersion (Chemtura); FZ-2105: Dow Corning Toray; Paraloid A-11: Thermoplastic acrylic resin (Dow); Dymax XR-9416: Water dilutable urethane acrylate (Dymax); BYK-333: Polyether modified polydimethylsiloxane (Byk); Coatosil 7602: Silicone copolymer with ethylene oxide pendent side chains (Momentive); and NeoRez R9679: Aliphatic waterborne urethane (DSM Coating Resins, LLC).

The following is a description of the substrates referred to in the application: PC Lens: Polycarbonate Ophthalmic Lens; CR-39: CR-39™ Polybisallyl Carbonate Ophthalmic Lens; MR-7: MR-7™ Polythiourethane Ophthalmic Lens; Trivex: Trivex™ Urethane Ophthalmic Lens; PET Film: Biaxially-Oriented Polyethylene Terephthalate Film; PC Plaque: Bayer Makrolon™ Polycarbonate Sheet; PC Film: 125 um thick PC substrate; Primed PET Film: Proprietary treatment on Biaxially-Oriented Polyethylene Terephthalate Film; and PMMA: Poly (methylmethacrylate).

Premixes:

The following Premixes were used for the examples. Premix 1: 135.01 grams of SR9035 was added to a round bottom flask containing 24.65 g 3-EGA equipped with a magnetic stir bar. The contents were stirred continuously at room temperature for 30 minutes. After stirring for 30 minutes, 850.65 grams of MEK-AC-2140Z was added slowly at room temperature with constant stirring and the mixture was stirred overnight. The mixture was then vacuum distilled using a Buschi Rotovap at 40° C. and 730 mTorr. The concentrated resin was then diluted with 192 g of PM glycol ether. The mixture was then transferred to a capped brown container suitable for packaging UV curable coatings and allowed to cool to room temperature. Premix 2: 70 grams of OT75 (75% solids in water) was added to a vessel containing 30 grams of Schercoquat IAS-PG and stirred continuously for 4 hours using a magnetic stir rod. Premix 3: 75 grams of REASOAP SR10 was added to a round bottom flask containing 25 grams of TMPTMP and stirred using a mechanical mixer at 70 C for 8 hours. The mixture was then transferred to a capped brown container suitable for packaging UV curable coatings and cooled to room temperature. Premix 4: 15 grams of Witcobond 240 was mixed with 85 grams of PM in a vessel for 30 minutes using a magnetic stir bar. Premix 5: In a 250 mL vessel, 35.8 g of Eastek 1400 was added to 128.5 g of de-ionized water and stirred for 10 minutes with a magnetic sir bar. 35.9 g of PM was added to the mixture and stirred for 30 minutes using a magnetic stir bar. Premix 6: 70 grams of PM Acetate and 30 grams of Paraloid A-11 are mixed for 3 hours at 60° C. Premix 7: 90 grams of PM with 10 grams of BYK-333 were mixed for 30 minutes at ambient conditions.

Example 1

94.7 grams of Premix 1, 1.47 grams of Premix 2, 1.50 grams of Premix 3, and 2.29 grams of Darocur 1173 were added to a vessel and stirred using a magnetic stir bar at room temperature for 30 minutes. The coating mixture was then allowed to rest for 1 hour.

Depending on mode of application coating mixture was further adjusted for solids by dilution with PM. The coating was applied variously via dip coating, draw down bar, flow coating and spin coating. Coated parts were cured at 2.0 J/cm2 with H bulb in Fusion UV Cure Unit. Cured samples pass water soak anti-fog testing, adhesion tests, and have a steel wool abrasion resistance up to 200 grams. When applied to PC lens, this formulation has a Bayer abrasion resistance of 2.79. When flow coated onto Bayer Makrolon polycarbonate sheet, this sample passes water soak anti-fog tests and has a steel wool abrasion resistance of 250 g. Coated lenses were tested for wipe tests as previously described. These coatings pass the IPA test up to 10 cycles, wet wipe tests up to 14 cycles, and running water wash tests up to 21 cycles.

Example 1 has been applied to CR-39. MR-7, Trivex, and PC lenses over a primer layer namely Premix 4. When applied to the primer layer, cured coatings pass water soak anti-fog testing, and boiling water adhesion testing.

Table 5 below shows the properties of the cured coating of Example 1 after a flow coating on Bayer Makrolon Polycarbonate sheet followed by a cure at 2.0 J/cm$^2$.

TABLE 5

| Properties | Example 1 |
| --- | --- |
| Thickness (um) | 4-6 |
| Haze (%) | 0.26 |
| Initial Antifog Test | Pass |
| Water Soak Anti-fog Test | Pass |
| Adhesion | Pass |
| Steel Wool (g) | 250 g |
| Taber(100 rev) | 5.71 |

Table 6 below shows the anti-fog properties after the Wipe and Wash Tests of Example 1's cured coating.

TABLE 6

| | Test name | # Cycles tested | # Cycles passed |
| --- | --- | --- | --- |
| Wipe tests | Dry cloth wipe test | 1 | 1 |
| | IPA wipe test | 10 | 10 |
| | Wet cloth wipe test | Until Failure | 14 |
| Wash | Running water test | Until Failure | 21 |
| | Soap/running water test | Until Failure | 21 |

Table 7 below shows the properties of the cured coating of Example 1 coated on different ophthalmic lens substrates (spin coating, cured at 2.0 J/cm$^2$). All substrates used in the study were surfaced by surfacing equipment and polished by conventional polishing methods prior to coating; The surfaced lens substrates were spin coated on the surfaced side with Premix 4, air dried for 90 min and then spin-coated with the coating of Example 1.

TABLE 7

| Properties | Substrate | | | |
|---|---|---|---|---|
| | CR-39 | MR-7 | Trivex | PC Lens |
| Thickness (μm) | 4.9 | 4.8 | 4.7 | 5.2 |
| Haze (%) | 0.21 | 0.30 | 0.26 | 0.53 |
| Initial Anti-fog Test | Pass | Pass | Pass | Pass |
| Water Soak Anti-fog Test | Pass | Pass | Pass | Pass |
| Adhesion | Pass | Pass | Pass | Pass |
| Boiling Water Adhesion | Pass | Pass | Pass | Pass |

Table 8 below shows the properties of the cured coating of Example 1 on 100 um thick pre-treated PET film. The coating was applied via a flow coating technique and cured at 2.0 J/cm$^2$.

TABLE 8

| Properties | PET film Pre-treatment | |
|---|---|---|
| | Corona (30 s) | Pre-coated with Premix -5* |
| Thickness (um) | 3.9-5.0 | 6.0-8.0 |
| Haze (%) | 1.5-2.0 | 1.46 |
| Initial Anti-fog | Pass | Pass |
| Water Soak Anti-fog Machine Test | Pass | Pass |
| Water Soak Anti-fog Test | Pass | Pass |
| Adhesion | Pass | Pass |

*PET film was pretreated by flow coating with Premix 5 and dried under ambient conditions for 30 min.

Example 2

69.88 grams of Premix 1, 1.09 grams of Premix 2, 1.11 grams of REASOAP SR-10, 1.69 grams of Darocure 1173, 0.37 grams of Tergitol 15-s-7, and 25.86 grams of PM were mixed using a magnetic stir bar at room temperature for 30 minutes. After mixing, the formulation was allowed to rest for 1 hour before application to the substrate. The coating was applied variously via dip coating and spin coating. Coated parts were cured at 2.0 J/cm2 with H bulb in Fusion UV Cure Unit. Cured samples pass water soak anti-fog testing, adhesion tests, and have a steel wool abrasion resistance up to 150 grams. When applied to PC lens, this formulation has a Bayer abrasion resistance of 2.82.

Example 3

69.88 grams of Premix 1, 1.09 grams of Premix 2, 0.83 grams of REASOAP SR-10, 0.28 grams of TMPTMP, 1.69 grams of Darocure 1173, 0.37 grams of Tergitol 15-s-7, and 25.86 grams of PM were mixed using a magnetic stir bar at room temperature for 30 minutes. After mixing, the formulation was allowed to rest for 1 hour. The coating was applied variously via dip coating and spin coating. Coated parts were cured at 2.0 J/cm2 with H bulb in Fusion UV Cure Unit. Cured samples pass water soak anti-fog testing, adhesion tests, and have a steel wool abrasion resistance up to 150 grams. When applied to PC lens, this formulation has a Bayer abrasion resistance of 3.30.

Table 9 below shows properties of cured coatings Examples 1-3. Coatings were applied via dip coat on finished plano polycarbonate lenses and cured at 2.0 J/cm$^2$.

TABLE 9

| Properties | Example 1 | Example 2 | Example 3 |
|---|---|---|---|
| Thickness (um) | 6.5 | 6.5 | 6.5 |
| Haze (%) | 0.28 | 0.30 | 0.35 |
| Initial Anti-fog Test | Pass | Pass | Pass |
| Water Soak Anti-fog Machine Test | Pass | Pass | Pass |
| Water Soak Anti-fog Test | Pass | Pass | Pass |
| Adhesion | Pass | Pass | Pass |
| Steel Wool (g) | 200 | 150 | 200 |

Example 4

41.26 grams of SR9035, 7.64 grams of 3-EGA, 1.09 grams of Premix 2, 1.11 grams of Premix 3, 1.69 grams of Darocur 1173, and 46.84 grams of PM were mixed using a magnetic stir bar for 30 minutes at room temperature. The coating was applied by spin coating. Coated parts were cured at 2.0 J/cm2 with H bulb in Fusion UV Cure Unit. Cured samples pass water soak anti-fog testing, adhesion tests, and have a steel wool abrasion resistance up to <50 grams. When applied to PC lens, this formulation has a Bayer abrasion resistance of 0.40.

Example 5

69.88 grams of Premix 1, 4.44 grams of REASOAP SR-10, 1.69 grams of Darocure 1173, 0.37 grams of Tergitol 15-s-7, and 25.86 grams of PM were mixed using a magnetic stir bar at room temperature for 30 minutes. After mixing, the mixture was allowed to rest for 1 hour before application to the substrate. The coating was applied variously via dip coating and spin coating. Coated parts were cured at 2.0 J/cm2 with H bulb in Fusion UV Cure Unit. Cured samples pass water soak anti-fog testing, adhesion tests, and have a steel wool abrasion resistance up to 100 grams. When applied to PC lens, this formulation has a Bayer abrasion resistance of 2.40.

Table 10 below shows properties of cured coatings of Examples 1-6. All the coatings were applied via spin coating on finished plano polycarbonate lenses. Coated lenses were cured at 2.0 J/cm$^2$.

TABLE 10

| Properties | Example 1 | Example 2 | Example 3 | Example 4 | Example 5 |
|---|---|---|---|---|---|
| Thickness (um) | 4.1 | 4.0 | 4.4 | 4.0 | 4.5 |
| Haze (%) | 0.25 | 0.31 | 0.29 | 0.30 | 0.22 |
| Initial Anti-fog Test | Pass | Pass | Pass | Pass | Pass |
| Water Soak Anti-fog Machine Test | Pass | Pass | Pass | Pass | Pass |

TABLE 10-continued

| Properties | Example 1 | Example 2 | Example 3 | Example 4 | Example 5 |
|---|---|---|---|---|---|
| Water Soak Anti-fog Test | Pass | Pass | Pass | Pass | Pass |
| Adhesion | Pass | Pass | Pass | Pass | Pass |
| Steel Wool (g) | 200 | 150 | 150 | <50 | 100 |
| Bayer | 2.79 | 2.82 | 3.3 | 0.4 | 2.4 |

Example 6

69.88 grams of Premix 1, 1.09 grams of Premix 2, 1.11 grams of REASOAP SR-10, 1.69 grams of Darocur 1173, 0.37 grams of Tergitol 15-s-7, and 65 grams of PM were mixed using a magnetic stir bar at room temperature for 30 minutes. After mixing, the formulation was allowed to rest for 1 hour. PET film was coated and cured at SolarGard of San Diego, Calif. These samples pass water soak anti-fog test and exhibit steel wool abrasion resistance up to 400 grams.

In another set of experiments, Example 6 was also applied via drawdown bar onto PC film. Coated parts were cured at 2.0 J/cm$^2$ with H bulb in Fusion UV Cure Unit. These samples pass water soak anti-fog, initial adhesion, and exhibit steel wool abrasion resistance up to 200 grams.

Table 11 below shows the properties of the cured samples of Example 6 applied to primed PET and PC films. The coating was applied via drawdown bar and cured using UV.

TABLE 11

| Properties | Primed PET Film* | PC Film |
|---|---|---|
| Thickness (um) | 4.5 | 3.0-8.0 |
| Haze (%) | 0.20-0.40 | 0.20-0.35 |
| Initial Anti-Fog Test | Pass | Pass |
| Water Soak Anti-fog Test | Pass | Pass |
| Steel Wool | 400 g | 200 g |
| Adhesion | 100% | 100% |
| YI | 1.58 | 1.19-1.30 |

*coated and cured at Solar Gard, San Diego, CA

Table 12 below demonstrates Example 6 coated to 4 micron thick on 125 um thick polycarbonate film. Freezer testing of the coated samples was performed on a passive freezer door.

TABLE 12

| Temperature (° F.) | Temperature (° C.) | Room Temperature (° C.) | Room Relative Humidity (%) | Handle 6 sec Test | Hinge 6 sec Test | LTF300 6 sec Test |
|---|---|---|---|---|---|---|
| 10 | −12.2 | 22.7 | 47.8 | Pass | Pass | Pass |
| 5 | −15 | 21.7 | 52.4 | Pass | Pass | Pass |
| 0 | −17.8 | 20.5 | 60.7 | Pass | Pass | Pass |
| −5 | −20.6 | 20.9 | 60.5 | Pass | Pass | Pass |

Table 13 below demonstrates Example 6 coated to 4 microns thick on a 125 um thick polycarbonate film. Freezer testing of the coated samples was performed on a passive freezer set to −12.2 C. The door was opened every 10 minutes for a 6 second duration for up to 1 hour. The length of time for fog the clear was measure and percent (%) fog of individual coated articles were measured. The ambient room temperature was 20.9 C, relative humidity 53.4%.

TABLE 13

| Time (min) | Clear Time (Sec) | Avg Fog (%) |
|---|---|---|
| 0 | 0 | 0 |
| 10 | 0 | 0 |
| 20 | 0 | 0 |
| 30 | 0 | 0 |
| 40 | 0 | 0 |
| 50 | 0 | 0 |
| 60 | 0 | 0 |

Table 14 below demonstrates the anti-fog properties of the coated PET films after machine wash testing at 1000 and 5000 cycles.

TABLE 14

| Cleaning Liquid | Number of Cycles | Test Method | Conditioning time before testing Anti-fog | Example 6 |
|---|---|---|---|---|
| Windex (Ammonia Free) | 1000 | Antifog (60° C., beaker, 1 min) | 0 min | Pass |
| | 5000 | | 0 min | Pass |
| Formula 409 Cleaner | 1000 | | 0 min | Pass |
| | 5000 | | 0 min | Pass |
| Deionized Water | 1000 | | 0 min | Fail |
| | | | 15 min | Fail |
| | | | 30 min | Pass |
| | 5000 | | 0 min | Fail |
| | | | 15 min | Fail |
| | | | 30 min | Fail |
| | | | 1 hour | Fail |
| | | | 2 hour | Fail |
| | | | 18 hour | Pass |

Example 7

69.04 grams of Premix 1, 1.06 grams of Premix 2, 1.08 grams of REASOAP SR-10, 1.69 grams of Darocur 1173, 1.57 grams of Capstone FS-35, and 25.56 grams of PM were mixed using a magnetic stir bar at room temperature for 30 minutes. After mixing, the formulation was allowed to rest for 1 hour. The coating was applied via spin coating on PC, CR-39, MR-7 and Trivex lenses. Coated parts were cured at 2.0 J/cm$^2$ with H bulb in Fusion UV Cure Unit. These samples pass water soak anti-fog and initial adhesion. The Bayer for coated PC sample is 2.68 and steel wool abrasion resistance 200 grams. When applied to other substrates including CR-39, MR-7, and Trivex, these samples maintained anti-fog properties, adhesion, exhibited steel wool abrasion resistance of 200 grams, and a Bayer abrasion of 2.5.

Example 7 was also applied to backside conventionally surfaced PC, CR-39, MR-7, MR-10, and Trivex lenses. Premix 4 was first applied to a selected substrate followed by Example 7. All coatings were applied and cured using a CrystalSpin SV spin coating and curing unit from LTI Coating Technologies, LLC. All coated substrates pass water soak anti-fog test, adhesion, and exhibit a steel wool resistance of 200 grams. These coatings also pass a 15-minute boiling water adhesion test.

Table 15 below shows the properties of the cured coating of Example 7 coated on different ophthalmic lens substrates (Spin coating, cured at 2.0 J/cm$^2$ using a Fusion UV unit). All substrates used in the study were surfaced by surfacing equipment and polished by conventional polishing methods prior to coating; The surfaced lens substrates were spin coated on the surfaced side with Premix 4 and dried for 45 seconds while spinning, and then spin-coated with the coating of Example 7.

TABLE 15

| Coating | Example 7 | Example 7 | Example 7 | Example 7 | Example 7 |
|---|---|---|---|---|---|
| Primer | Premix 4 | Premix 4 | None | Premix 4 | Premix 4 |
| Substrate | CR39 | Poly carbonate | Poly carbonate | MR7 | Trivex |
| Appearance | Smooth/ Excellent | Smooth/ Excellent | Smooth/ Excellent | Smooth/ Excellent | Smooth/ Excellent |
| Thickness (mm) | 4.8 | 4.9 | 4.4 | 4.9 | 4.4 |
| Haze (%) | 0.35 | 0.26 | 0.22 | 0.30 | 0.19 |
| Initial Anti-Fog Test | Pass | Pass | Pass | Pass | Pass |
| Water Soak Anti-Fog Machine Test | Pass | Pass | Pass | Pass | Pass |
| Adhesion | Pass | Pass | Pass | Pass | Pass |
| Boiling Water Adhesion 100° C. for 1 h | Pass | Pass | Fail | Pass | Pass |
| Steel Wool (g) | 200 | 200 | 200 | 200 | 200 |
| Bayer Ratio | 2.5 | 2.5 | 2.68 | 2.5 | 2.5 |

Table 16 below shows the properties of the cured coating of Example 7 coated on different ophthalmic lens substrates (Spin coating, cured at 2.0 J/cm$^2$ using a Crystal Spin SV Unit). All substrates used in the study were surfaced by surfacing equipment and polished by conventional polishing methods prior to coating; The surfaced lens substrates were spin coated on the surfaced side with Premix 4 inside the CrystalSpin SV Unit and dried for 45 seconds while spinning, and then spin-coated with the coating of Example 7.

TABLE 16

| Substrate | Thickness (mm) | Haze (%) | YI | Steel Wool (g) | Adhesion | Initial Anti-fog Test | Water Soak Anti-Fog Test |
|---|---|---|---|---|---|---|---|
| Poly | 5.8 | 0.22 | 0.98 | 200 | 100% | Pass | Pass |
| MR-7 | 5.7 | 0.21 | 1.88 | 200 | 100% | Pass | Pass |
| MR-8 | 5.8 | 0.25 | 1.92 | 200 | 100% | Pass | Pass |
| MR-10 | 5.8 | 0.22 | 1.69 | 200 | 100% | Pass | Pass |
| CR-39 | 5.1 | 0.21 | 0.90 | 200 | 100% | Pass | Pass |
| Trivex ™ | 5.1 | 0.19 | 0.96 | 200 | 98% | Pass | Pass |

Example 7a 69.04 grams of Premix 1, 1.06 grams of Premix 2, 1.69 grams of Darocur 1173, 1.57 grams of Capstone FS-35, and 25.56 grams of PM are mixed using a magnetic stir bar at room temperature for 30 minutes. After mixing, the formulation was allowed to rest for 1 hour. The coating was applied via spin coat on PC lens. Coated parts were cured at 2.0 J/cm2 with H bulb in Fusion UV Cure Unit. These samples fail water soak anti-fog and pass initial adhesion.

Example 7b 69.04 grams of Premix 1, 1.06 grams of OT-75, 1.69 grams of Darocur 1173, 1.57 grams of Capstone FS-35, and 25.56 grams of PM are mixed using a magnetic stir bar at room temperature for 30 minutes. After mixing, the formulation was allowed to rest for 1 hour. The coating was applied via spin coat on PC lens. Coated parts were cured at 2.0 J/cm2 with H bulb in Fusion UV Cure Unit. These samples fail water soak anti-fog and pass initial adhesion.

Table 17 below shows the properties of cured samples containing no reactive surfactant combination compared with Sample 9. The coating was spin coated on PC lenses and cured using a Fusion UV cure unit at 2.0 J/cm2.

TABLE 17

| Properties | Example 7 | Example 7a | Example 7b |
|---|---|---|---|
| Thickness (um) | 4.2 | 4.0 | 4.0 |
| Haze (%) | 0.22 | 0.19 | 0.11 |
| Initial Anti-fog Test | Pass | Pass | Pass |
| Water Soak Anti-Fog Test | Pass | Fail | Fail |
| Adhesion | Pass | Pass | Pass |

Example 8

69.04 grams of Premix 1, 1.06 grams of Premix 2, 1.08 grams of Emulsogen APS-100, 1.69 grams of Darocur 1173, 1.57 grams of Capstone FS-35, and 25.56 grams of PM were mixed using a magnetic stir bar at room temperature for 30 minutes. After mixing, the formulation was allowed to rest for 1 hour. The coating was applied via spin coating on PC lenses. Coated parts were cured at 2.0 J/cm2 with H bulb in Fusion UV Cure Unit. Cured samples pass water soak anti-fog, fail initial adhesion, and exhibit a steel wool abrasion resistance of 200 g.

Example 9

69.04 grams of Premix 1, 1.06 grams of Premix 2, 1.08 grams of REASOAP SR-20, 1.69 grams of Darocur 1173, 1.57 grams of Capstone FS-35, and 25.56 grams of PM were mixed using a magnetic stir bar at room temperature for 30 minutes. After mixing, the formulation was allowed to rest for 1 hour. The coating was applied via spin coating on PC lenses. Coated parts were cured at 2.0 J/cm2 with H bulb in Fusion UV Cure Unit. Cured samples pass water soak anti-fog, fail initial adhesion, and exhibit a steel wool abrasion resistance of 150 g.

Table 18 below shows the properties of cured samples of different reactive surfactant combinations. The coating was spin coated on Gentex PC lenses and cured using a Fusion UV cure unit at 2.0 J/cm2.

TABLE 18

| Properties | Example 7 | Example 8 | Example 9 |
|---|---|---|---|
| Thickness (um) | 4.2 | 4.0 | 4.1 |
| Haze (%) | 0.22 | 0.27 | 0.27 |
| Initial Anti-fog Test | Pass | Pass | Pass |
| Water Soak Anti-Fog Test | Pass | Pass | Pass |
| Adhesion | Pass | Fail | Fail |

Example 10

69.04 grams of Premix 1, 1.06 grams of Igepal CA-720, 1.08 grams of Premix 3, 1.69 grams of Darocur 1173, 1.57 grams of Capstone FS-35, and 25.56 grams of PM were mixed using a magnetic stir bar at room temperature for 30 minutes. After mixing, the formulation was allowed to rest for 1 hour. The coating was applied via spin coat on PC lenses. Coated parts were cured at 2.0 J/cm2 with H bulb in Fusion UV Cure Unit. These samples pass water soak anti-fog and initial adhesion.

Example 11

69.04 grams of Premix 1, 1.06 grams of Igepal CA-720, 1.08 grams of REASOAP SR-10, 1.69 grams of Darocur 1173, 1.57 grams of Capstone FS-35, and 25.56 grams of PM were mixed using a magnetic stir bar at room temperature for 30 minutes. After mixing, the formulation was allowed to rest for 1 hour. The coating was applied via spin coat on PC lenses. Coated parts were cured at 2.0 J/cm2 with H bulb in Fusion UV Cure Unit. These samples pass water soak anti-fog and initial adhesion.

Example 12

69.04 grams of Premix 1, 1.06 grams of Igepal CA-720, 1.08 grams of REASOAP ER-10, 1.69 grams of Darocur 1173, 1.57 grams of Capstone FS-35, and 25.56 grams of PM were mixed using a magnetic stir bar at room temperature for 30 minutes. After mixing, the formulation was allowed to rest for 1 hour. The coating was applied via spin coat on PC lenses. Coated parts were cured at 2.0 J/cm2 with H bulb in Fusion UV Cure Unit. These samples pass water soak anti-fog and initial adhesion.

Table 19 below shows the properties of the cured samples of different non-reactive surfactants using Igepal. The coating was spin coated on Gentex PC lenses and cured using a Fusion UV cure unit at 2.0 J/cm2.

TABLE 19

| Properties | Example 10 | Example 11 | Example 12 |
| --- | --- | --- | --- |
| Thickness (um) | 4.4 | 4.0 | 4.3 |
| Haze (%) | 0.23 | 0.21 | 0.28 |
| Initial Anti-fog Test | Pass | Pass | Pass |
| Water Soak Anti-Fog Test | Pass | Pass | Pass |
| Adhesion | Pass | Pass | Pass |

Example 13

69.04 grams of Premix 1, 1.06 grams of Premix 2, 1.08 grams of REASOAP SR-10, 1.00 grams of Irgacure 500, 1.57 grams of Capstone FS-35, and 25.56 grams of PM were mixed using a magnetic stir bar at room temperature for 30 minutes. After mixing, the formulation was allowed to rest for 1 hour. The coating was applied via spin coat on PC. Coated parts were cured at 2.0 J/cm2 with H bulb in Fusion UV Cure Unit. These samples failed water soak anti-fog and passed initial adhesion. This coating exhibited a Bayer abrasion of 1.72.

Table 20 below shows the property comparison of using different photoinitiators. The coating was spin coated on the backside surface PC and cures using a Fusion UV cure unit at 2.0 J/cm2.

TABLE 20

| Properties | Example 7 | Example 13 |
| --- | --- | --- |
| Thickness (um) | 4.2 | 4.1 |
| Haze (%) | 0.25 | 0.24 |
| Initial Anti-fog Test | Pass | Pass |
| Water Soak Anti-fog test | Pass | Fail |
| Adhesion | Pass | Pass |
| Bayer | 2.68 | 1.72 |
| YI | 1.31 | 1.16 |

Example 14

6.75 grams of Premix 6 was mixed with 93.15 grams of PM and 0.1 grams of Premix 7 for 1 hour. The liquid was allowed to rest and was later flow coated onto PMMA plaques and dried for 30 minutes at ambient conditions. 69.04 grams of Premix 1, 1.06 grams of Premix 2, 1.08 grams of Premix 3, 1.69 grams of Darocur 1173, 1.57 grams of Capstone FS-35, and 25.56 grams of PM were then mixed using a magnetic stir bar at room temperature for 30 minutes. After mixing, the formulation was allowed to rest for 1 hour. This liquid was then applied to the primer-coated PMMA via drawdown bar. Coated parts were cured at 2.0 J/cm2 with H bulb in Fusion UV Cure Unit. This coating passed initial adhesion and water soak anti-fog.

Table 21 below shows the properties of Example 14 applied to PMMA plaque with Primer.

TABLE 21

| Primer | Coating Thickness (um) | Haze (%) | Adhesion | Initial Anti-Fog Test | Water Soak Anti-Fog Test | Steel Wool Abrasion (g) |
| --- | --- | --- | --- | --- | --- | --- |
| Example 14 | 10.9 | 0.48 | Pass | Pass | Pass | 200 |

Example 15

332 grams of PGM-AC-2140Y, 9.9 grams of SR-272, 52.9 grams of SR-9035, 4.44 grams of REASOAP SR-10, 4.5 grams of Premix 2, 6.8 grams of Darocur 1173, 1.5 grams of Tergitol 15-s-7, and 168 grams of PM were mixed using a magnetic stir bar at room temperature for 30 minutes. After mixing, the formulation was allowed to rest for 1 hour. The coating was applied via drawdown bar to a primed PET substrate. Coated parts were cured at 2.0 J/cm2 with an H bulb in a Fusion UV Cure Unit. This coating failed initial adhesion and passed water soak anti-fog.

Table 22 below shows the properties of the cured samples of Example 6 and Example 15 applied to a 50 um thick Primed PET film via a drawdown bar and cured using a Fusion UV cure unit at 2.0 J/cm².

TABLE 22

| Properties | Example 6 | Example 15 |
| --- | --- | --- |
| Thickness (um) | 4.5 | 4.0-6.9 |
| Haze (%) | 0.20-0.40 | 0.34 |
| Adhesion (%) | Pass | Fail |
| Initial Anti-Fog | Pass | Pass |
| Water Soak Anti-Fog Test | Pass | Pass |

Example 16

In accordance with teachings of U.S. Pat. No. 6,946,498 B2, 3.38 g of de-ionized water was added to 73.88 g NPC-ST-30 and stirred at room temperature. 5.16 g of A-174 was slowly dripped into the stirring mixture and mixed for 2 hours. 11.12 g of TMPTA was then added to the stirring mixture followed by 3.28 g of OT-75 and allowed to mix for 12 hours. 1.59 g of Darocur 1173 was then added to the mixture and mixed for an additional 30 minutes at room temperature. The coating was applied to PET film or PC Plaque via draw down bar. Coated parts were cured at 1.0 J/cm2 with H bulb in Fusion UV Cure Unit. Samples failed water soak anti-fog testing.

Table 23 below shows the properties of the cured coating of Example 16 applied via a draw down bar, and cured at 1.0 J/cm$^2$.

TABLE 23

| Properties | Example 16 | Example 16 |
|---|---|---|
| Substrate | PET | PC Plaque |
| Thickness (um) | 3.5 | 3.5 |
| Haze (%) | 1.1 | 0.39 |
| Initial Anti-fog Test | Pass | Pass |
| Water Soak Anti-fog Machine Test | Fail | Fail |
| Water Soak Anti-fog Test | Fail | Fail |
| Adhesion | Fail | Fail |
| Steel Wool (g) | 500 | 500 |

All patents, patent applications, and published references cited herein are hereby incorporated by reference in their entirety. It should be emphasized that the above-described embodiments of the present disclosure are merely possible examples of implementations, merely set forth for a clear understanding of the principles of the disclosure. Many variations and modifications may be made to the above-described embodiment(s) without departing substantially from the spirit and principles of the disclosure. It can be appreciated that several of the above-disclosed and other features and functions, or alternatives thereof, may be desirably combined into many other different systems or applications. All such modifications and variations are intended to be included herein within the scope of this disclosure, as fall within the scope of the appended claims.

What is claimed is:

1. A coating composition which when applied to a substrate and cured provides a transparent, washable anti-fog coating, the coating composition comprising:
    one or more radiation-curable acrylates having hydrophilic regions comprising one or more hydrophilic alkoxylate groups, the one or more hydrophilic alkoxylate groups having the formula —((CH2)$_n$O—)$_m$-, where n can be equal or greater than 1 and equal or less than 3 (1<n<3) and m can be equal or greater than 1 and equal or less than 10 (1<m<10);
    about 0.5% to about 2% by weight of a reactive surfactant comprising a reactive moiety based on the weight of the coating composition; and
    a photoinitiator,
    wherein, upon the exposure of the photoinitiator to light energy, the one or more radiation-curable acrylates are cured to form a hydrophilic network with the reactive surfactant being bound to the network by binding of the reactive moiety of the surfactant to one or more acrylate groups in the hydrophilic regions of the one or more radiation-curable acrylates,
    wherein, when cured on a substrate, the washable anti-fog coating does not fog when exposed for 1 minute to water vapor from water in a beaker heated to 50° C. after the washable anti-fog coating has been soaked in room temperature water for 1 hour followed by drying at 25° C. and 50% relative humidity for 12 hours.

2. The coating composition of claim 1 further comprising metal oxide nanoparticles dispersed throughout the network to provide abrasion-resistant properties to the coating.

3. The coating composition of claim 1 wherein the one or more radiation-curable acrylates comprise ethoxylated acrylates.

4. The coating composition of claim 3 wherein the concentration of the ethoxylated acrylates is between 7% and 55% by weight of the coating composition.

5. The coating composition of claim 1 wherein the one or more radiation-curable acrylates comprise multifunctional ethoxylated acrylate monomers.

6. The coating composition of claim 1 wherein the hydrophilic network comprises ethoxylated diacrylates and ethoxylated triacrylates.

7. The coating composition of claim 1 wherein the reactive surfactant comprises one or more reactive surfactants with one or more reactive groups selected from a group consisting of an alkenyl group, an acrylate group, and a thiol group.

8. The coating composition of claim 1 wherein the reactive surfactant comprises one or more reactive surfactants with an alkenyl reactive group, the reactive surfactant having a formula of: (CH$_2$=CH)—R, where R is selected from ether sulfonates, phosphoric acid esters, polyethers and copolymers thereof, nonionic polyethers, alkyl ethers, alkenyl ethers, and olefinic ethers.

9. The coating composition of claim 1 wherein the reactive surfactant comprises one or more reactive surfactants with an acrylate reactive group, the reactive surfactant having a formula of: (CH$_2$=CHCOO)—R, where R is selected from ether sulfonates, phosphoric acid esters, and polyethers and copolymers thereof.

10. The coating composition of claim 1 wherein the reactive surfactant comprises one or more reactive surfactants with a thiol reactive group, the reactive surfactant having a formula of: (SH)—R, where R is selected from ether sulfonates, phosphoric acid esters, and polyethers and copolymers thereof.

11. The coating composition of claim 1 further comprising a non-reactive surfactant.

12. A ultraviolet (UV) curable coating composition comprising:
    one or more radiation-curable, multifunctional acrylates having hydrophilic regions comprising one or more hydrophilic alkoxylate groups, the one or more hydrophilic alkoxylate groups having the formula —((CH2)$_n$O—)$_m$-, where n can be equal or greater than 1 and equal or less than 3 (1<n<3) and m can be equal or greater than 1 and equal or less than 10 (1<m<10);
    about 0.5% to about 2% by weight of one or more reactive surfactants based on the weight of the coating composition, wherein the reactive surfactants have one or more reactive groups comprising an alkenyl group, acrylate group, thiol group or a combination thereof; and a photoinitiator, wherein, upon the exposure of the photoinitiator to UV light energy, the one or more radiation-curable acrylates are cured to form a hydrophilic network with the one or more reactive surfactants bound to the network by binding the one or more reactive groups of the one or more reactive surfactants to one or more acrylate groups in the hydrophilic regions of the one or more radiation-curable acrylates, and wherein the coating composition provides a transparent, washable anti-fog coating when applied to a substrate and cured, and the washable anti-fog coating does not fog when exposed for 1 minute to water vapor from water in a beaker heated to 50° C. after the washable anti-fog coating has been soaked in room temperature water for 1 hour followed by drying at 25° C. and 50% relative humidity for 12 hours.

13. The coating composition of claim 12 further comprising metal oxide nanoparticles dispersed throughout the network to provide abrasion-resistant properties to the coating.

* * * * *